United States Patent
Groezinger et al.

[11] Patent Number: 5,986,672
[45] Date of Patent: Nov. 16, 1999

[54] METHOD AND SYSTEM FOR FORMING A ROTATED IMAGE ON AN IMAGING ELEMENT USING LIMITED SYSTEM RESOURCES

[75] Inventors: John L. Groezinger, Cottage City; Donald H. Singley, Woodbury, both of Minn.

[73] Assignee: Minnesota, Mining and Manufacturing 3M Center, St. Paul, Minn.

[21] Appl. No.: 08/949,735

[22] Filed: Oct. 14, 1997

[51] Int. Cl.$^6$ .................................................. G06F 15/00
[52] U.S. Cl. ............................................................ 345/437
[58] Field of Search .................................. 345/433, 437, 345/436, 118, 121, 126

[56] References Cited

U.S. PATENT DOCUMENTS

| | | | |
|---|---|---|---|
| 4,627,020 | 12/1986 | Anderson | 364/900 |
| 4,658,430 | 4/1987 | Anderson | 382/46 |
| 4,703,515 | 10/1987 | Baroody, Jr. | 382/46 |
| 4,837,845 | 6/1989 | Pruett | 382/46 |
| 5,034,733 | 7/1991 | Okazawa | 340/727 |
| 5,050,225 | 9/1991 | Itoh | 382/46 |
| 5,111,192 | 5/1992 | Kadakia | 340/727 |
| 5,293,481 | 3/1994 | Mita | 395/163 |
| 5,359,706 | 10/1994 | Sterling | 395/137 |
| 5,577,182 | 11/1996 | Hayashi | 395/137 |
| 5,611,001 | 3/1997 | Kadakia | 382/297 |
| 5,613,018 | 3/1997 | Eldridge | 382/296 |

FOREIGN PATENT DOCUMENTS 0 609 622 10/1994 European Pat. Off. .
0 744 711 A2 11/1996 European Pat. Off. .

OTHER PUBLICATIONS

"A fast algorithm for transposing large multidimensional image data sets," van Heel, *Ultramicroscopy*, Oct. 1991, Netherlands, vol. 38, No. 1, pp. 75–83.

"Multimegapoint FFT's Running on Workstation Computers," Grimm et al., *1991 IEEE, Proceedings of the Asilomar Conference on Signals, Systems and Computers*, Pacific Grove, CA, Nov. 4–6, 1991, pp. 101–105.

*Primary Examiner*—Phu K. Nguyen
*Attorney, Agent, or Firm*—Kent J. Sieffert

[57] ABSTRACT

The present invention is a method and system for forming a rotated image on an imaging element without requiring vast amounts of physical memory, virtual memory or specialized hardware. Furthermore, the system and technique is efficient and inexpensive to implement.

The present invention effects efficient image rotation by decomposing the image into an array of data blocks defined by a plurality of data block columns and a plurality of data block rows. The present invention independently rotates each data block and writes the rotated data block to a temporary image file starting at a corresponding calculated position. The starting position is such that during a post-processing phase a plurality of rotated data blocks are retrieved and easily processed to form at least one complete scan line of pixels. Finally, the imaging element is sequentially exposed by a radiation source to form each scan line on the imaging element, thereby forming a rotated image on the imaging element.

25 Claims, 7 Drawing Sheets

Image Stored in as Image File

| Line₀ | Line₁ | ..... | Line_{L-3} | Line_{L-2} | Line_{L-1} |

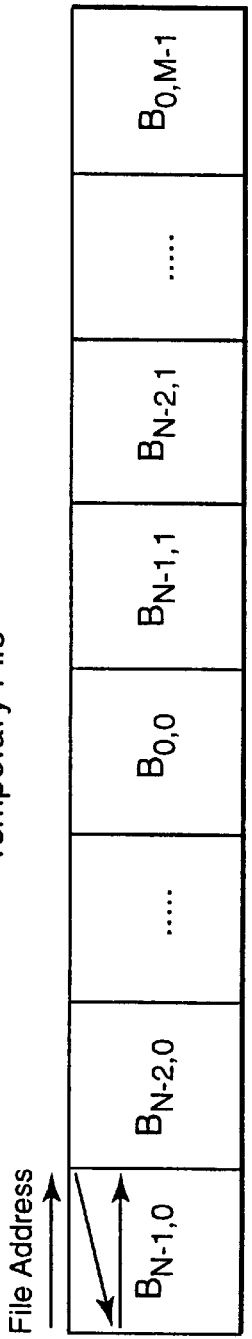

METHOD AND SYSTEM FOR FORMING A ROTATED IMAGE ON AN IMAGING ELEMENT USING LIMITED SYSTEM RESOURCES

FIELD OF THE INVENTION

This invention relates generally to the field of image processing, and more particularly, to a method and system for forming a rotated image on an imaging element using limited system resources.

BACKGROUND OF THE INVENTION

An imaging system typically includes an input imaging device that generates image information and an output imaging device that forms a visible representation of the image on an imaging element based on the image information. In a medical imaging system, for example, the input imaging device may include a diagnostic device, such as a magnetic resonance (MR), computed tomography (CT), conventional radiography (X-ray), digital radiography (DR) or ultrasound device. Alternatively, the input imaging device may include a user interface device, such as a keypad, mouse, or trackball, which is also capable of generating medical image information. As a further alternative, the input imaging device may include an image archival workstation for retrieving archived images. The output imaging device in a medical imaging system typically includes a digital laser imager. The laser imager exposes the imaging element in response to the image information to form the visible representation of the image. Alternatively, the laser imager may combine multiple images into an "image page" and expose the imaging element to form a visible representation of the images.

The image information generated by the input imaging device includes image data containing digital image values representative of the image and imaging commands specifying operations to be performed by the laser imager. Each of the digital image values corresponds to one of a plurality of pixels in the original image, and represents an optical density associated with the respective pixel. In response to an imaging command, the laser imager converts the digital image values to generate laser drive values used to modulate the intensity of a scanning laser. The laser drive values are calculated to produce exposure levels, on the imaging element, necessary to reproduce the optical densities associated with the pixels of the original image when the element is developed, either by wet chemical processing or dry thermal processing.

Prior to imaging the element, an output imaging device may perform a number of additional operations on the image data to produce a variety of different format and/or appearance characteristics. Often, it is necessary to rotate the image data 90, 180 or 270 degrees prior to imaging the element. One conventional technique is to write an image into a memory in one direction and read it out in an orthogonal direction. This technique, however, consumes vast amounts of system resources. For example, a typical medical image may have 5120 scan lines, 4096 pixels per scan lines and eight bits per pixel. In order to rotate this typical medical image using conventional techniques requires over 40 MB of memory. Therefore, many imaging systems either incorporate specialized hardware or rely on virtual memory to extend the system's overall memory capacity. Specialized image-rotation hardware is, however, extremely expensive and therefore may not be a viable solution for some imaging systems. Furthermore, virtual memory requires a sophisticated operating system and is inherently slow. Thus, a complex operating system and virtual memory may not be well-suited for certain real-time applications that need to quickly and deterministically respond to events.

For the reasons stated above, and for other reasons stated below which will become apparent to those skilled in the art upon reading and understanding the present specification, there is a need in the art for an image rotation software system capable of rotating an image without requiring specialized hardware, massive amounts of physical memory or virtual memory. Furthermore, there is a need for such a system which is efficient and inexpensive to implement.

SUMMARY OF THE INVENTION

As explained in detail below, the present invention is directed to a method and system for rotating an input image represented by an array of input pixel data defined by a plurality of pixel lines.

In one aspect, the invention is a method including the step of defining an array of data blocks having a plurality of data block columns and a plurality of data block rows. Each data block corresponds to a portion of the input pixel data and is defined by a plurality of data block pixel lines. The corresponding input pixel data of each data block is independently rotated into a rotate buffer and written to a temporary image file at a starting position according to a desired degree of rotation. The rotated pixel data is retrieved from the temporary image file and assembled to form at least one scan line of output pixel data. The element is exposed by a radiation source to form each scan line on the element. The element may be any element suitable for such exposure such as a photographic imaging element or a photothermographic imaging element.

In one embodiment, the image is received from an input imaging device and stored to a storage device. A data block row of the stored pixel data is read back into memory prior to rotation, thereby minimizing memory requirements.

In one embodiment, the image has L pixel lines having P pixels per pixel line. Furthermore, each data block has Y data block pixel lines and X pixels per data block pixel line. Additionally, the array of data blocks has M data block columns and N data block rows where M=P/X and N=L/Y. In order to effect a 90° rotation, the inventive method calculates the starting position within the temporary image file for the rotated pixel data based on the equation:

starting position for $B_{ij}=((N-1-i)*X*Y*Z)+(j*X*Y*Z*N)$, where i equals the block row of the data block, j equals the block column of the data block and Z equals the bytes per pixel. Similarly, in order to effect a 180° rotation, the starting position is calculated based on the equation:

starting position for $B_{ij}=((N-1-i)*X*Y*Z*M)+((M-1-j)*X*Y*Z)$, where i equals the block row for the data block, j equals the block column for the data block and Z equals the bytes per pixel. In order to effect a 270° rotation, the starting position is calculated based on the equation:

starting position for $B_{ij}=i*X*Y*Z+((M-1-j)*X*Y*Z*N)$, where i equals the block row for the data block, j equals the block column for the data block and Z equals the bytes per pixel.

In another aspect, the present invention is a computer-readable storage medium having a software program executable on a suitably configured computer for rotating one or more input images. In another aspect, the present invention is an output imaging device for forming a rotated image on an imaging element. The output imaging devices includes a storage device, a radiation source for exposing the imaging element, and a central-processing unit (CPU) coupled to the storage device and the radiation source. The CPU executes the software system including the step of defining an array of data blocks having a plurality of data block columns and a plurality of data block rows. Each data block corresponds to an array of the pixel data and is defined by a plurality of data block pixel lines. The software system independently rotates the corresponding input pixel data of each data block into a rotate buffer and writes the rotated pixel data to a temporary image file starting at a corresponding calculated position. The software system retrieves the rotated pixel data from the temporary image file and assembles the pixel data to form at least one scan line of pixel data. Finally, the CPU commands the radiation source to expose the element to form each scan line on the element.

In yet another aspect, the present invention is directed toward an imaging system including one or more input imaging devices residing on a network, an output imaging device, and a software program executing on a suitably configured computer within the output imaging device for forming a rotated image on an imaging element in accordance with the present invention. In one embodiment, the input imaging device is a medical modality and the output imaging device is a medical laser imager.

BRIEF DESCRIPTION OF THE DRAWINGS

FIG. 6 illustrates one embodiment of image data of one data block as independently rotated into a rotate buffer during a pre-processing phase;

FIG. 7 illustrates one embodiment of image data as stored in a temporary image file on a storage device as the data blocks are written to calculated positions within the temporary image file in accordance with the present invention;

DETAILED DESCRIPTION

In the following detailed description, references are made to the accompanying drawings which illustrate specific embodiments in which the invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Figure 1:
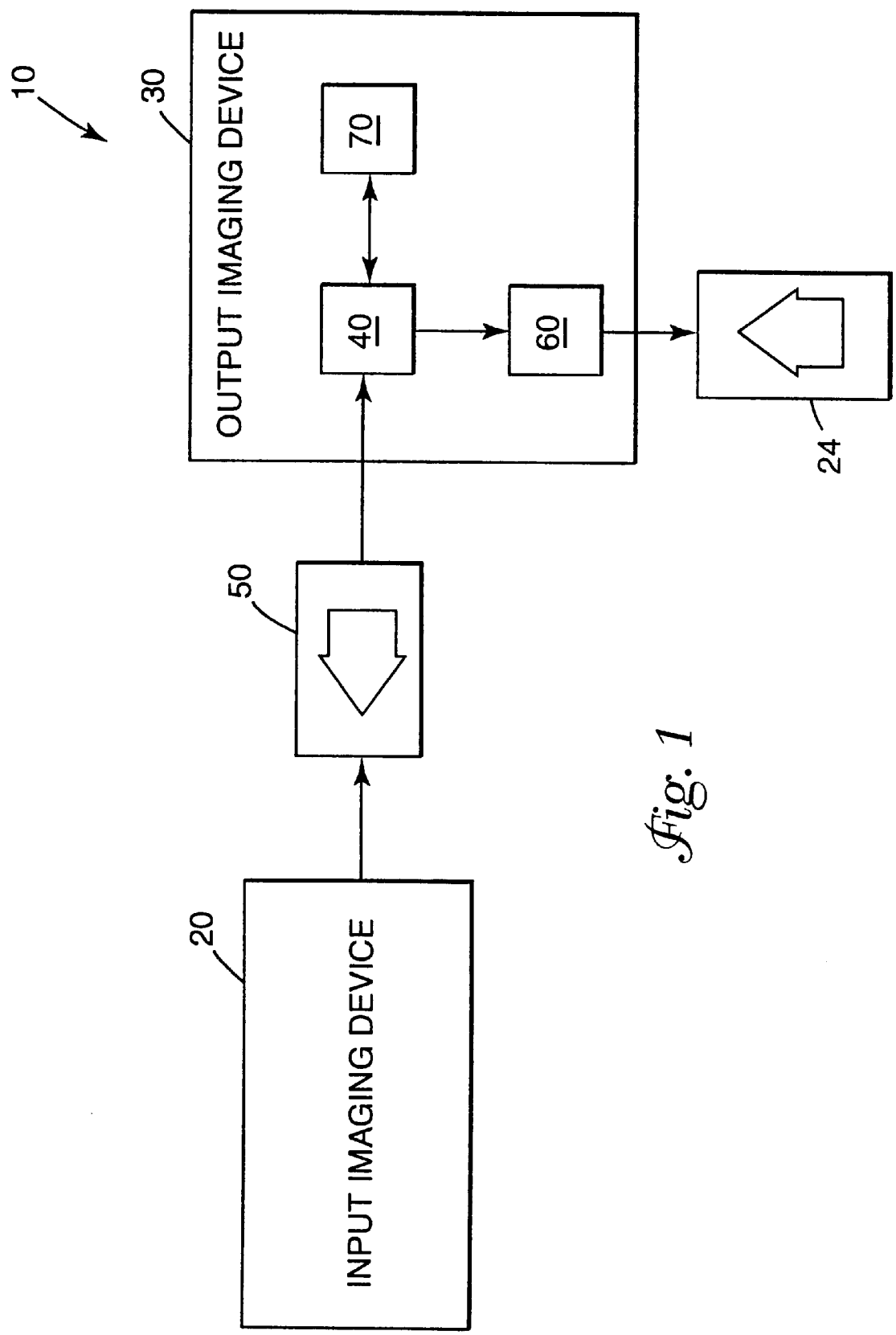
FIG. 1 is a block diagram of one embodiment of an imaging system effecting an image rotation method and apparatus according to the present invention.

FIG. 1 is a schematic block diagram illustrating one embodiment of an imaging system 10 having an input imaging device 20 and an output imaging device 30. In one embodiment, input imaging device 20 is a medical modality, such as a magnetic resonance (MR), computed tomography (CT), conventional radiography (X-ray), or ultrasound device, and output imaging device 30 is a continuous tone medical laser imager.

Input imaging device 20 generates input image 50 and communicates input image 50 to output imaging device 30 in the form of image information. The image information generated by the input imaging device 20 includes input pixel data and imaging commands specifying operations to be performed by the laser imager. Each of the input pixel data corresponds to one of a plurality of pixels in the original image, and represents an optical density associated with the respective pixel.

In response to an imaging command, controller 40 of output imaging device 30 converts the input pixel data to generate laser drive values used to modulate the intensity of a radiation source 60 on imaging element 24. As one example, imaging element 24 may be photographic and output imaging device 30 may include a processor station (not shown) for chemical processing and developing of the image formed on imaging element 24. In another example, imaging element 24 may be photothermographic which can be thermally processed and need not be chemically processed. Other imaging processes are also suitable for the present invention including direct thermal imaging, ablation imaging, dye transfer, ink jet, dye sublimation and thermal mass transfer.

Controller 40 commands output imaging device 30 such that radiation source 60 is modulated to produce a representation of input image 50 on imaging element 24. In one embodiment, radiation source 60 comprises a laser diode scan module for emitting a suitable beam of radiation. Controller 40 represents any logic circuit suitable for device control. For example, controller 40 may be an embedded microprocessor having RAM for data manipulation and general program execution. As output imaging device 30 receives input image 50, controller 40 stores images 50 on storage device 70. In this manner, storage device 70 may be any suitable device such as a hard disk or removable storage media. Furthermore, software suitable for operation of output imaging device 30 in accordance with the present invention resides on storage device 70. Alternatively, the software may not reside on storage device 70 but may be maintained in a read-only memory (ROM) or flash memory.

Prior to imaging element 24, output imaging device 30 performs a number of operations on the input pixel data of input image 50. For example, the input pixel data of input image 50 may be received in a sequence which is orthogonal to the scan direction of radiation source 60. In this situation, in order to form a correct visible representation of input image 50, output imaging device 30 rotates the input pixel data according to the present invention as described in detail below.

Figure 2:
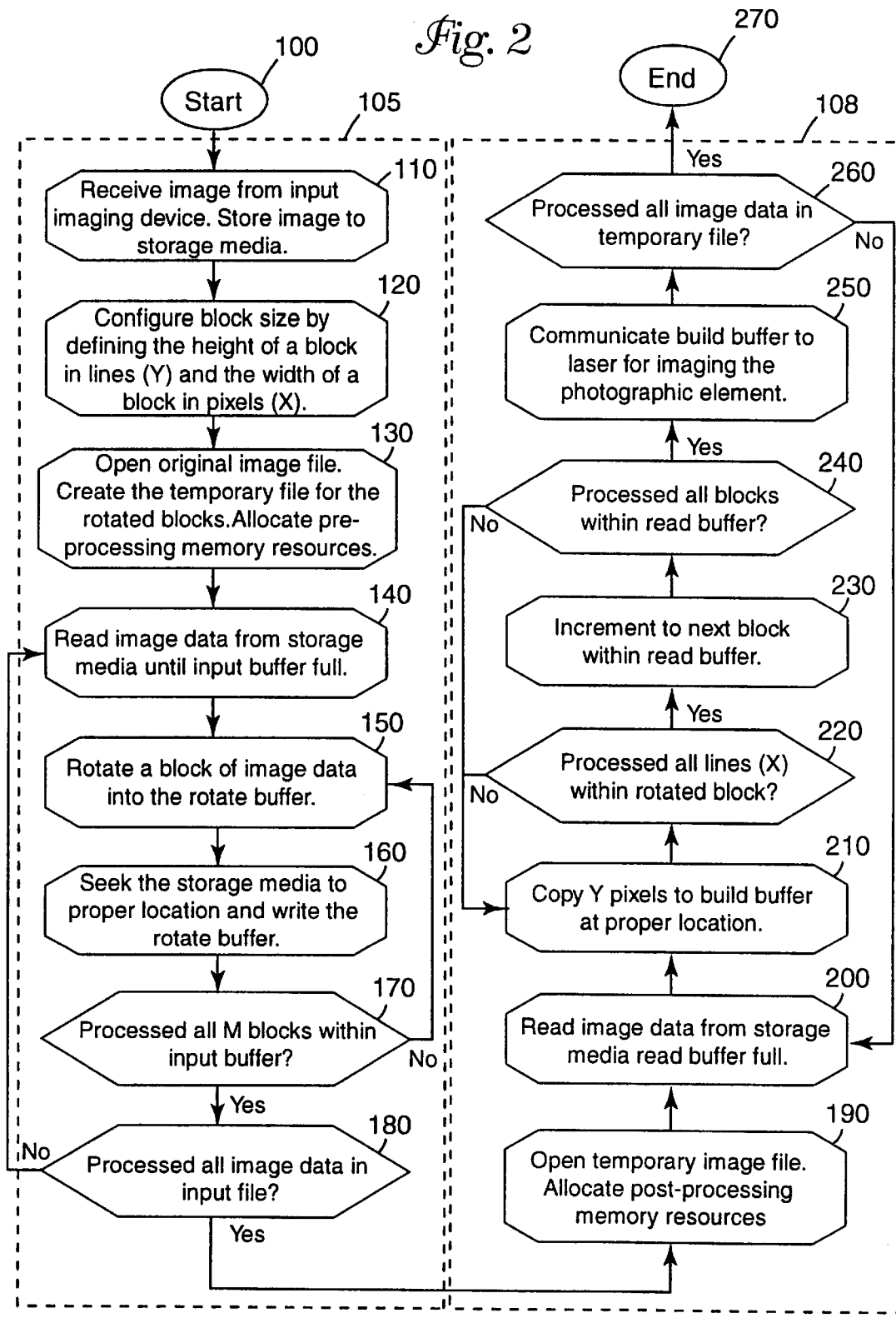
FIG. 2 is a flow chart illustrating a mode of operation of the imaging system of FIG. 1.

FIG. 2 is a flow chart which illustrates one example of a mode of operation for output imaging device 30 during the image rotation process. More specifically, controller 40 within imaging system 10 of FIG. 1 executes a software program implementing the logical steps illustrated in the flow chart of FIG. 2. In the following explanation, references will be made to both the flow chart of FIG. 2 and the imaging system of FIG. 1.

As illustrated in FIG. 2, the software program can be characterized by two general phases, pre-processing phase 105 and post-processing phase 108. As will become clear upon further explanation below, pre-processing phase 105 defines a unique scheme for decomposing input image 50 into manageable data blocks and rotating each data block individually. Each rotated data block is then written to storage device 70 in a manner which facilitates their reconstruction into a completely rotated image in post-processing phase 108.

More specifically, controller 40 begins at starting step 100 and immediately enters pre-processing phase 105 by proceeding to step 110. In step 110, controller 40 receives input image 50 from input imaging device 20 and stores the input pixel data of input image 50 to storage device 70. Preferably, the input pixel data of input image 50 is written to storage device 70 as it is received, thereby eliminating the need for controller 40 to have sufficient memory to receive and buffer the entire input pixel data of input image 50.

Figures 3, 4:
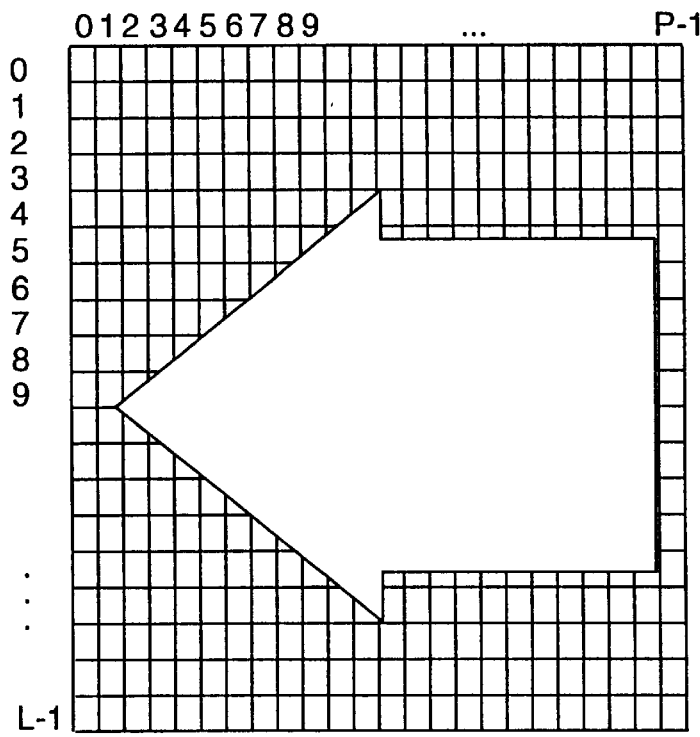
FIG. 3 is a visual representation of an image defamed by an array of pixel lines, such that each pixel line has a plurality of pixels per line.
FIG. 4 illustrates an image as received from an input imaging device and stored on a storage device as a series of pixel lines.

FIG. 3 is a visual representation of one embodiment of input image 50 as received from input imaging device 20. As illustrated by FIG. 3, input image 50 has a plurality of pixel lines, each pixel line having a plurality of pixels. Furthermore, input image 50 is arranged in an array of L pixel lines having P pixels per line. Each element of the array corresponds to one pixel to be formed on imaging element 24. In this manner, input image 50 comprises a total of L*P pixels. Input imaging device 20 communicates input image 50 sequentially such that output imaging device 20 receives input image 50 one line at a time until L lines have been received and stored to storage device 70. FIG. 4 illustrates input image 50 as stored on storage device 70. Specifically, input image 50 is stored in a file having a total size of L*P*BPP bytes and is organized by line starting with line and ending with line $_{L-1}$. In this equation, BPP is the number of bytes required to store a single pixel. For example, if each pixel occupies 8 bits, then BPP equals 1. If each pixel requires two bytes, such as a 12 bit pixel, then BPP equals 2.

Figure 5:
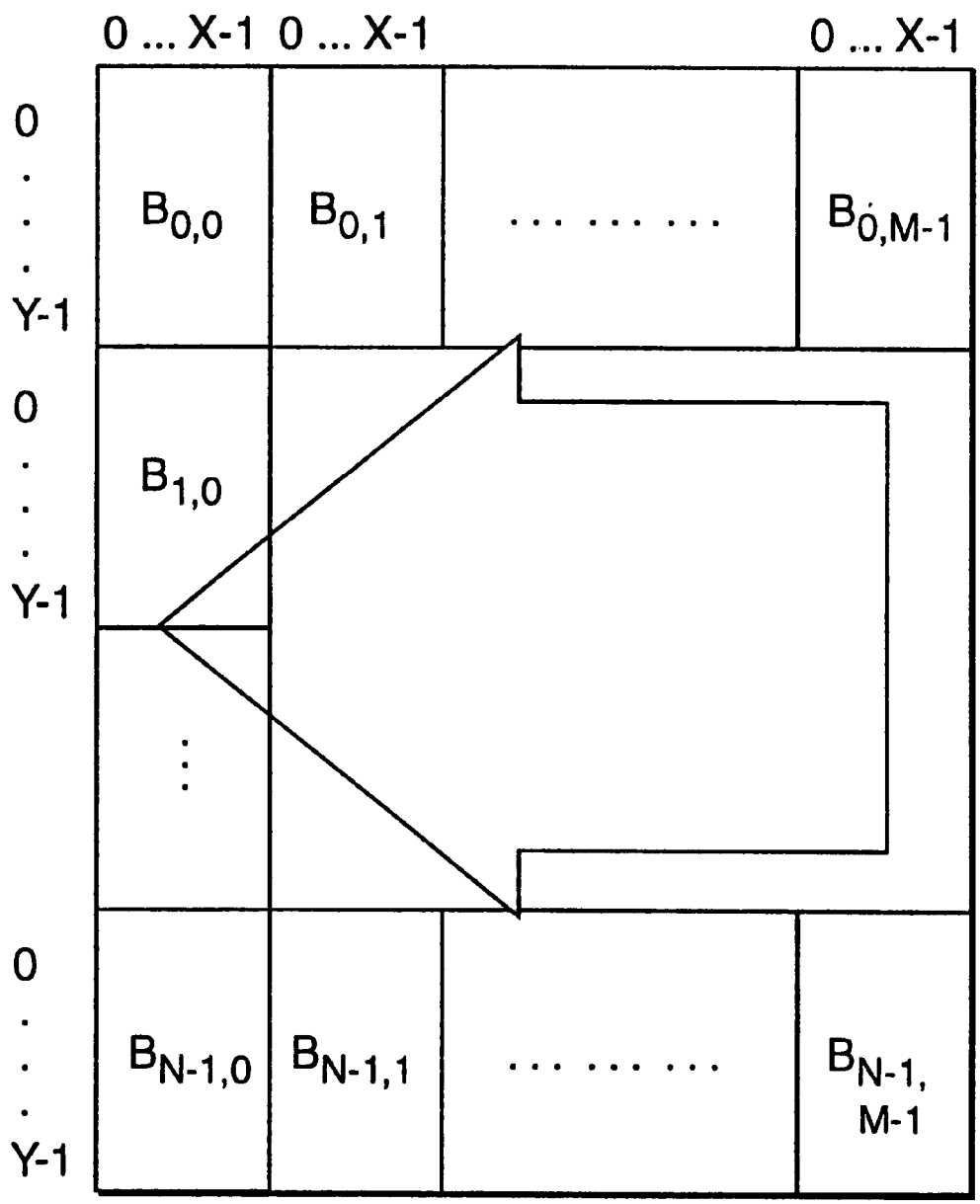
FIG. 5 illustrates the decomposition of an image into an array of data blocks having a plurality of data block rows and a plurality of data block columns in accordance with the present invention.

Referring again to FIG. 2, after receiving and storing the input pixel data of input image 50 from input imaging device 20, controller 40 proceeds step 120 in which controller 40 defines the scheme for decomposing input image 50 into data blocks which can be individually rotated without requiring vast system resources. More specifically, as illustrated in FIG. 5, controller 40 divides input image 50 into an array of data blocks having M block columns and N block rows, thereby defining a plurality of data blocks $B_{0,0}$ through $B_{N-1,M-1}$. Controller 40 defines a number of data block pixel lines (Y) and a number of pixels per data block pixel line (X) for each data block such that M=P/X and N=L/Y. For example, if input image 50 comprises 5120 lines having 4096 pixels per line, controller 40 may be configured such that each data block B is 256 pixels wide and 256 data block pixel lines tall. Thus, in this example, input image 50 is divided into an array of 16 data block columns (M) and 20 data block rows (N), thereby decomposing input image 50 into 320 data blocks B. Images that do not easily decompose into blocks according to the above-described method may be padded with null image data to ensure decomposition.

Upon defining the dimensions of the data block and the dimensions of the array of data blocks, controller 40 proceeds to processing step 130 and performs several initialization functions including: (1) opening the file in which input image 50 is stored on storage device 70, (2) creating a temporary file for storing the individually rotated data blocks and (3) allocating all memory resources in RAM necessary to perform pre-processing of input image 50. These memory resources include an input buffer capable of holding Y pixel lines of input image 50 and a rotate buffer capable of holding an entire data block. Thus, the input buffer is capable of holding Y*P pixels while the rotate buffer is capable of holding X*Y pixels. For example, assuming input image 50 has 5120 lines having 4096 pixels per line and a data block of 256 by 256 is chosen, the input buffer and the rotate buffer are capable of holding 1M pixels and 64K pixels respectively. Thus, if each pixel is requires 8 bits, the input buffer and the rotate buffer are 1M bytes and 64K bytes in size, respectively. If two bytes are needed to store a single pixel, then the input buffer and the rotate buffer are 2M bytes and 128K bytes in size, respectively.

Referring again to FIG. 2, upon execution of step 130 controller 40 reads Y*P pixels from the image file, thereby filling the entire input buffer. The pixels are ordered within the input buffer as they were received from input imaging device 20. For example, the first P pixels in the input buffer define the first line L received from input imaging device 20. Because Y*P pixels were read from the image file, the input buffer contains the entire first block row of FIG. 5, $B_{0,0}$ through $B_{0,M-1}$. The pixel line of each block, however, are interleaved in the input buffer. For example, the input buffer contains the first line of data block $B_{0,0}$ followed by the first line of $B_{0,1}$. This pattern repeats such that M blocks are contained in the input buffer.

In step 150, controller 40 individually rotates one data block into the rotate buffer. More specifically, for each data block dispersed throughout the input buffer, controller 40 traverses each line (Y pixels) of the data block and writes each of the Y pixels to a proper location of the data buffer. For example, in order to rotate input image 50 by 90 degrees, controller 40 reads each pixel of each line and writes each pixel in an orthogonal location in the output buffer. In one embodiment, a plurality of pixels are retrieved and written to corresponding locations concurrently. For example, depending upon the configuration of controller 40, it may be convenient to read four pixels in one 32-bit read, thereby reducing the number of memory operations. In this configuration, four output pointers are maintained which designate the proper output in the output buffer.

As illustrated in FIG. 6, the rotated pixel data formed in the rotate buffer is essentially orthogonal to the input pixel data in the input buffer. For example, as described above, the input buffer contains input pixel data arranged by block line such that the first line of block $B_{0,0}$ is followed by the first line of block $B_{0,1}$. The rotate buffer, however, contains an entire data block, such as $B_{0,0}$, arranged by pixel column. In this manner, the rotate buffer contains X pixel columns, each pixel column having Y pixels, such that the first pixel column is followed by the second pixel column and continuing through the last pixel column.

Referring again to the flowchart of FIG. 2, upon forming a rotated data block, controller 40 proceeds to step 160 and commands storage device 70 to write the rotated pixel data at an appropriate location in the temporary file. More specifically, controller 40 writes the rotated data blocks to the temporary file such that they may be easily read and assembled during post-processing phase 108 into a fully rotated image. FIG. 7 illustrates one embodiment of the temporary image file as it resides on storage device 70 that corresponds to the rotation of input image 50 by 90 degrees. As illustrated in FIG. 7, the first data block read from the input buffer, $B_{0,0}$, is written as the $N^{th}$ block of the temporary file. Each data block is therefore stored contiguously in the file starting at a corresponding address.

More specifically, for 90 degree rotation, a starting address for each rotated data block $B_{ij}$ can be calculated according to the following equation:

$$address=(N-1-i)*PPB+j*PPB*N,$$

where PPB is the number of pixels per block as defined by X*Y* bytes per pixel (BPP). Note, the calculated address points to the starting address for the first pixel of the rotated block. Similarly, for an 180 rotation, the following equation can be used to calculate a starting address for each rotated block $B_{ij}$:

$$address=(N-1-i)*PPB*M+(M-1-j)*PPB.$$

Similarly, for an 270 rotation, the following equation can be used to calculate a starting address for each rotated block $B_{ij}$:

$$address=i*PPB+(M-1-j)*PPB*N.$$

By independently rotating and uniquely writing data blocks to calculated positions within the temporary file, the above technique minimizes memory requirements for rotating images. For example, only a small X*Y rotate buffer is required. Furthermore, by decomposing an image in M*N data blocks, only M*N file seeks are required in order to properly address the temporary file. In addition, the number of file seeks may be further reduced by adjusting the size of the data block to approximate the size of a track on the storage device. For example, conventional storage devices have a track size of between 100 KBytes and 200 KBytes.

Referring again to FIG. 2, after writing the rotated pixel data to the temporary file, controller 40 proceeds to step 170 and determines whether all M data blocks within the input buffer have been independently rotated and written to storage device 70. If not, controller 40 jumps back to step 150 and repeats steps 150 and 160 until the complete input buffer has been processed. If all data blocks in the input buffer have been processed, controller 40 proceeds to step 180 and determines whether the entire image file has been read and processed. If not, controller 40 jumps back to step 140 and refills the input buffer and processes it according to steps 150 and 160. Upon finishing the data file, controller 40 proceeds to step 190 of post-processing phase 108.

In step 190, controller 40 performs several initialization functions including: (1) opening the temporary file holding the rotated data blocks and (2) allocating all necessary memory resources in RAM needed to perform post-processing of input image 50. These memory resources include a read buffer and a build buffer for holding output pixel data, each capable of holding X*L pixels. For example, assuming input image 50 has 5120 lines having 4096 pixels per line and a data block of 256 by 256 is chosen, the read buffer and the build buffer are each capable of holding 1.25M pixels. Thus, if each pixel requires 8 bits, the read buffer and the build buffer each hold 1.25M bytes of output pixel data.

Upon execution of step 200 controller 40 reads X*L pixels of rotated pixel data from the temporary file, thereby filling the read buffer. On this first pass, the read buffer contains N rotated data blocks ordered from $B_{N-1,0}$ to $B_{0,0}$. Furthermore, the output pixel data in the read buffer is ordered such that all X rotated pixel columns of each block are contained in sequence. Thus, the read buffer holds enough output pixel data to produce the first X complete scan lines of the rotated image; however, each scan line must be formed by concatenating the corresponding rotated pixel column from the data blocks. For this reason, controller 40 proceeds to step 210 and walks the read buffer while coping each line of the block into the appropriate location within the build buffer.

More specifically, assuming a 90 degree rotation, the initial block in the read buffer is $B_{N-1,0}$. As such, the first Y pixels of the read buffer correspond to the first rotated pixel column of this block and as such are copied to the first Y pixels of the build buffer as the beginning of an initial scan line. The next Y pixels of the read buffer correspond to the second rotated pixel column of the same block; however, these pixels are the beginning of the second scan line and as such are copied starting at address L of the build buffer. By walking the entire read buffer and copying all of the data, controller 40 builds X complete scan lines which may be formed on imaging element 24.

Figure 8:
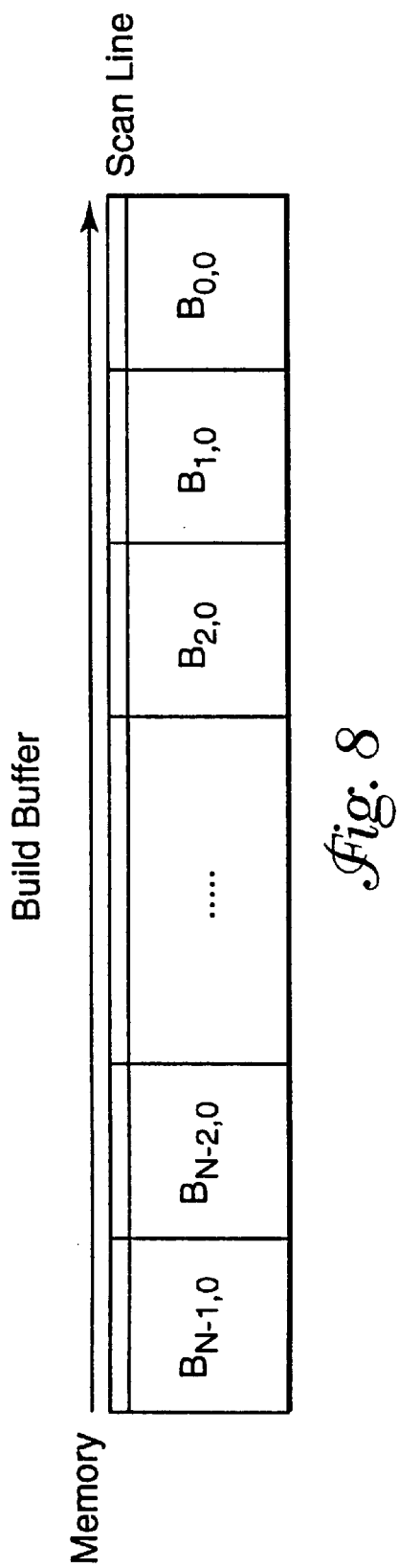
FIG. 8 illustrates one embodiment of image data as reassembled from the temporary image file during a post-processing phase in order to form scan lines for communication to a radiation source.

In step 220, controller 40 determines whether all X lines of the block have been copied, if not, the controller branches back to step 210. If the entire block has been processed, controller 40 continues to process the read buffer by proceeding through step 230 and 240 until all of the rotated data blocks in the read buffer have been properly distributed throughout the build buffer so as to form X complete scan lines. FIG. 8 illustrates the build buffer after the entire read buffer and the rotated data blocks have been processed such that the build buffer contains X complete scan lines stored contiguously in memory.

Figure 9:
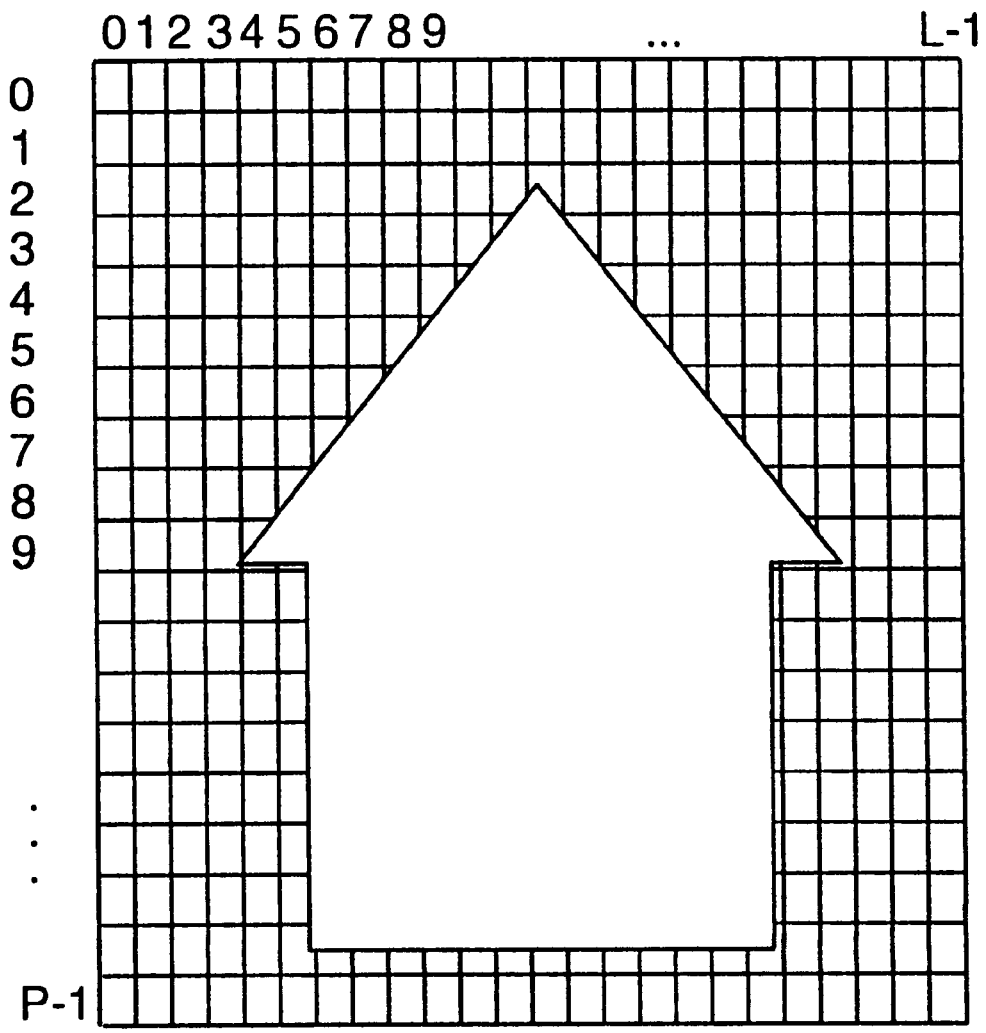
FIG. 9 is a visual representation of the image of FIG. 3 rotated 90° according to the present invention.

In step 250, controller 40 communicates the scan lines to radiation source 60 for imaging element 24. Upon communicating the assembled scan lines, controller 40 proceeds to step 260 and determines whether all of the data from the temporary image file has been processed and communicated to radiation source 60. If not, controller returns to step 200 and refills the read buffer and processes it according to steps 210, 220, 230, 240 and 250 as detailed above. Upon completing the temporary file, controller 40 proceeds to step 270 and exits the image rotation software. FIG. 9 is a visual representation of the image of FIG. 3 rotated 90° according to the present invention.

Implementation of a Preferred Embodiment of the
Software Portion the Present Invention The following software listing illustrates one embodiment of the software program described above. In the following listing, the following parameters correspond to the above discussion: P=big columns, L=bigrows, M=in__blocks__x, N=in__blocks__y, Y=in__lines__per__block, and X=in__columns__per__block.

```
#define bigcolumns 4096
#define bigrows 5120
#define in_blocks_x 16
#define in_blocks_y 20
#define in_lines_per_block 256
#define in_columns_per_block 256
#include <assert.h>
#include <stdio.h>
#include <stdlib.h>
#include <string.h>
#include <time.h>
typedef unsigned char U8;
typedef unsigned short U16;
typedef unsigned int U32;
typedef double F64;
typedef U16 Pixel;
#define REPEATS (1)
void rotate (Pixel **source, Pixel **dest);
main()
{
    unsigned int i,j,k,l,col;
    Pixel *inputImage,*outputImage,*source,*dest,*rotateImage,*finalImage;
    FILE *streamin,*stream,*streamout,*streamfinal;
    clock_t timer;
    static clock_t totalTime = 0;
    /* get block of memory which is size of defined input buffer */
    inputImage = (Pixel *) malloc(sizeof(Pixel)*in_lines_per_block*bigcolumns);
    assert(inputImage != NULL);
    /* get block of memory to rotate into */
    outputImage = (Pixel *) malloc(sizeof(Pixel)*in_lines_per_block*
    in_columns_per_block);
    assert(outputImage != NULL);
    /* get block of memory to read meta file into */
    rotateImage = (Pixel *) malloc (sizeof(Pixel)*in_columns_per_block*bigrows);
    assert(rotateImage != NULL);
    /* get block of memory to transform above into */
    finalImage = (Pixel *) malloc (sizeof(Pixel)*in_columns_per_block*bigrows);
    assert(finalImage != NULL);
    /* read in sample image to see if this works (from disk), (debug only) */
    streamin = fopen("bigimg","rb");
    assert(streamin != NULL);
    /* setup file to write to */
    stream = fopen("imageFile","wb+");
    assert(stream != NULL);
    /* setup file to write final rotation to */
    streamfinal = fopen("imageFile.final","wb+");
    assert(streamfinal != NULL);
    timer = clock();
    /* do this for every set of blocks going down the image */
    for (i=1;i<=in_blocks_y;i++){
    /* read in the block of data */
/*
    fread (inputImage, sizeof(Pixel), (size_t) in_lines_per_block *
    (size_t) bigcolumns, streamin);
*/
    /* do this for every block going across */
    for (j=1;j<=in_blocks_x;j++){
        source=inputImage+(j-1)*in_columns_per_block;
        /* rotate in assembly small blocks */
        rotate(&source,&outputImage);
        /* seek to the correct disk location */
        fseek (stream,(in_blocks_y-i)*sizeof(Pixel)*in_lines_per_block*
        in_columns_per_block+(j-1)*sizeof(Pixel)*in_lines_per_block*
        in_columns_per_block*in_blocks_y,SEEK_SET);
        /* write to disk */
        assert(fwrite(outputImage,sizeof(Pixel),
        in_lines_per_block*in_columns_per_block,stream) ==
        in_lines_per_block*in_columns_per_block);
    }
}
/* clean up after the previous set of writes to this disk file */
fclose (stream);
totalTime += (clock() - timer);
printf("Read from disk and write to disk meta file took %f seconds for %u cols %u
lines\n",
        (((float) totalTime))/CLOCKS_PER_SEC,bigcolumns,bigrows);
totalTime = 0;
timer = clock();
/* open it for reading */
streamout = fopen("imageFile","rb");
```

-continued

```
assert(streamout != NULL);
/* repeat through all blocks across the image (now down the image) */
for (i=1;i<=in_blocks_x;i++){
    /* read in the block of data */
    fread (rotateImage, sizeof(Pixel), (size_t) in_lines_per_block *
    (size_t) bigrows, streamout);
    /* post-process the data on a block by block method */
    source = rotateImage;
    /* for every block going across */
    for (j=1;j<=in_blocks_y;j++){
        /* for every line going down the rotated block */
        for (l=1;l<=in_columns_per_block;l++){
            /* set up the output pointer for a new line of output */
            dest = finalImage + bigrows*(l-1) + in_lines_per_block*(j-1);
            /* continue to read in the data and write for a given line */
            for (k=1;k<=in_lines_per_block;k++){
                *dest = *source;
                source++;
                dest++;
            }
        }
    }
    /* write to disk */
/*
    assert(fwrite(finalImage,sizeof(Pixel),
    in_lines_per_block*bigrows,streamfinal) ==
    in_lines_per_block*bigrows);
*/
}
totalTime += (clock() - timer);
printf("Read from Meta file and write to disk took %f seconds for %u cols %u lines\n",
    (((float) totalTime))/CLOCKS_PER_SEC,bigcolumns,bigrows);
/* clean up */
fclose (streamin);
fclose (streamout);
fclose (streamfinal);
free(finalImage);
free(rotateImage);
free(outputImage);
free(inputImage);
return 0;
}
```

Various embodiments have been described of an efficient method and system for forming a rotated image on an imaging element without requiring vast amounts of physical memory, virtual memory or specialized hardware. The present invention is applicable to the general field of image processing and may be implemented in any general image output device. For example, the present invention is suitable for application in a medical laser imager. The present invention is also applicable to an imaging system in which a plurality of images are received from one or more input imaging devices residing on a network. This application is intended to cover any adaptations or variations of the present invention. It is manifestly intended that this invention be limited only by the claims and equivalents thereof.

What is claimed is:

1. A method for forming a rotated image on an imaging element from an input image, wherein the input image is represented by an array of input pixel data defined by a plurality of pixel lines, the method comprising the steps of:

defining an array of data blocks having a plurality of data block columns and a plurality of data block rows, wherein each data block corresponds to a portion of the input pixel data defined by a plurality of data block pixel lines;

rotating the corresponding input pixel data of each data block into a rotate buffer;

writing the rotated pixel data to a temporary image file starting at a calculated position;

retrieving rotated pixel data from the temporary image file to assemble at least one scan line of output pixel data; and forming each scan line on the imaging element.

2. The method of claim 1, wherein the rotating step comprises the steps of:

receiving the input image from an input imaging device;

storing input pixel data of the input image to a storage device; and reading a data block row of the input pixel data stored on the storage device.

3. The method of claim 1, wherein the retrieving step retrieves a data block column of rotated pixel data from the temporary image file stored on the storage device.

4. The method of claim 1, wherein the retrieving step retrieves a data block row of rotated pixel data from the temporary image file stored on the storage device.

5. The method of claim 1, wherein the image has L pixel lines and P pixels per pixel line, and wherein the data block has Y data block pixel lines and X pixels per data block pixel line, and further wherein the array of data blocks has M data block columns and N data block rows where M=P/X and N=L/Y.

6. The method of claim 5, wherein the writing step calculates the starting position within the temporary image file for the rotated pixel data based on the equation:

$$\text{starting position for } B_{ij} = ((N-1-i)*X*Y*Z) + (j*X*Y*Z*N),$$

wherein i equals the block row of the data block, j equals the block column of the data block and Z equals the bytes per pixel.

7. The method of claim 5, wherein the writing step calculates the starting position within the temporary image file for the rotated pixel data based on the equation:

$$\text{starting position for } B_{ij}=((N-1-i)*X*Y*Z*M)+((M-1-j)*X*Y*Z),$$

wherein i equals the block row for the data block, j equals the block column for the data block and Z equals the bytes per pixel.

8. The method of claim 5, wherein the writing step calculates the starting position within the temporary image file for the rotated pixel data based on the equation:

$$\text{starting position for } B_{ij}=i*X*Y*Z+((M-1-j)*X*Y*Z*N),$$

wherein i equals the block row for the data block, j equals the block column for the data block and Z equals the bytes per pixel.

9. The method of claim 1, wherein the forming step includes the step of exposing a photographic imaging element.

10. The method of claim 1, wherein the forming step includes the step of exposing a photothermographic imaging element.

11. A computer-readable storage medium having a software program executable on a suitably configured computer for rotating an input image, wherein the input image is represented by an array of input pixel data defined by a plurality of pixel lines, the software program comprising the steps of:

defining an array of data blocks having a plurality of data block columns and a plurality of data block rows, wherein each data block corresponds to an array of the input pixel data defined by a plurality of data block pixel lines;

rotating the corresponding input pixel data of each data block into a rotate buffer;

writing the rotated pixel data to a temporary image file starting at a corresponding calculated position; and retrieving rotated pixel data from the temporary image file to assemble at least one complete pixel line of output pixel data.

12. The computer-readable storage medium of claim 11, wherein the rotating step of the software program comprises the steps of:

receiving the input image from an input imaging device;

storing the input pixel data of the input image to a storage device; and reading a data block row of the input pixel data stored on the storage device.

13. The computer-readable storage medium of claim 11, wherein the retrieving step of the software program retrieves a data block column of rotated pixel data from the temporary image file stored on the storage device.

14. The computer-readable storage medium of claim 11, wherein the retrieving step of the software program retrieves a data block row of rotated pixel data from the temporary image file stored on the storage device.

15. An output imaging device for forming a rotated image on an imaging element from an input image, wherein the input image is represented by an array of input pixel data defined by a plurality of pixel lines, the output imaging device comprising:

a storage device;

a radiation source for exposing the imaging element;

a software system comprising the steps of:

defining an array of data blocks having a plurality of data block columns and a plurality of data block rows, wherein each data block corresponds to an array of the input pixel data defined by a plurality of data block pixel lines, rotating the corresponding input pixel data of each data block into a rotate buffer, writing the rotated pixel data to a temporary image file on the storage device starting at a corresponding calculated position, retrieving the rotated pixel data from the temporary image file to assemble at least one scan line of output pixel data, and exposing the imaging element with a radiation source to form each scan line on the imaging element; and a central-processing unit (CPU) coupled to the storage device and the radiation source, wherein the CPU executes the software system.

16. The output imaging device of claim 15, wherein the rotating step of the software system comprises the steps of:

receiving the input image from an input imaging device;

storing the input pixel data of the input image to a storage device; and reading a data block row of the input pixel data stored on the storage device.

17. The output imaging device of claim 15, wherein the retrieving step of the software system retrieves a data block column of the rotated pixel data from the temporary image file stored on the storage device.

18. The output imaging device of claim 15, wherein the retrieving step of the software system retrieves a data block row of the rotated pixel data from the temporary image file stored on the storage device.

19. The output imaging device of claim 15, wherein the image has L pixel lines and P pixels per pixel line, and wherein the data block has Y data block pixel lines and X pixels per data block pixel line, and further wherein the array of data blocks has M data block columns and N data block rows where M=P/X and N=L/Y.

20. The output imaging device of claim 19, wherein the writing step of the software program calculates the starting position within the temporary image file for the rotated pixel data based on the equation:

$$\text{starting position for } B_{ij}=((N-1-i)*X*Y*Z)+(j*X*Y*Z*N),$$

wherein i equals the block row of the data block, j equals the block column of the data block and Z equals the bytes per pixel.

21. The output imaging device of claim 19, wherein the writing step of the software program calculates the starting position within the temporary image file for the rotated pixel data based on the equation:

$$\text{starting position for } B_{ij}=((N-1-i)*X*Y*Z*M)+((M-1-j)*X*Y*Z)$$

wherein i equals the block row for the data block, j equals the block column for the data block and Z equals the bytes per pixel.

22. The output imaging device of claim 19, wherein the writing step of the software program calculates the starting position within the temporary image file for the rotated pixel data of each rotate buffer based on the equation:

$$\text{starting position for } B_{ij}=i*X*Y*Z+((M-1-j)*X*Y*Z*N),$$

wherein i equals the block row for the data block, j equals the block column for the data block and Z equals the bytes per pixel.

23. The imaging system of claim 15, wherein the output imaging device is a medical laser imager.

24. An imaging system comprising:

one or more input imaging devices residing on a network;

an output imaging device; and a software program executing on a suitably configured computer within the output imaging device for forming a rotated image from an input imaging on an imaging element, wherein the input image is represented by an array of input pixel data defined by a plurality of pixel lines, the software program performing the steps of:

defining an array of data blocks having a plurality of data block columns and a plurality of data block rows, wherein each data block corresponds to an array of the input pixel data defined by a plurality of data block pixel lines, rotating the corresponding input pixel data of each data block into a rotate buffer, writing the rotated pixel data to a temporary image file on the storage device starting at a corresponding calculated position, retrieving rotated pixel data from the temporary image file to assemble at least one scan line of output pixel data, and forming each scan line on the imaging element, thereby forming a rotated image on the imaging element.

25. The imaging system of claim 24, wherein the input imaging device is a medical modality and the output imaging device is a medical laser imager.

* * * * *